Figure 1:
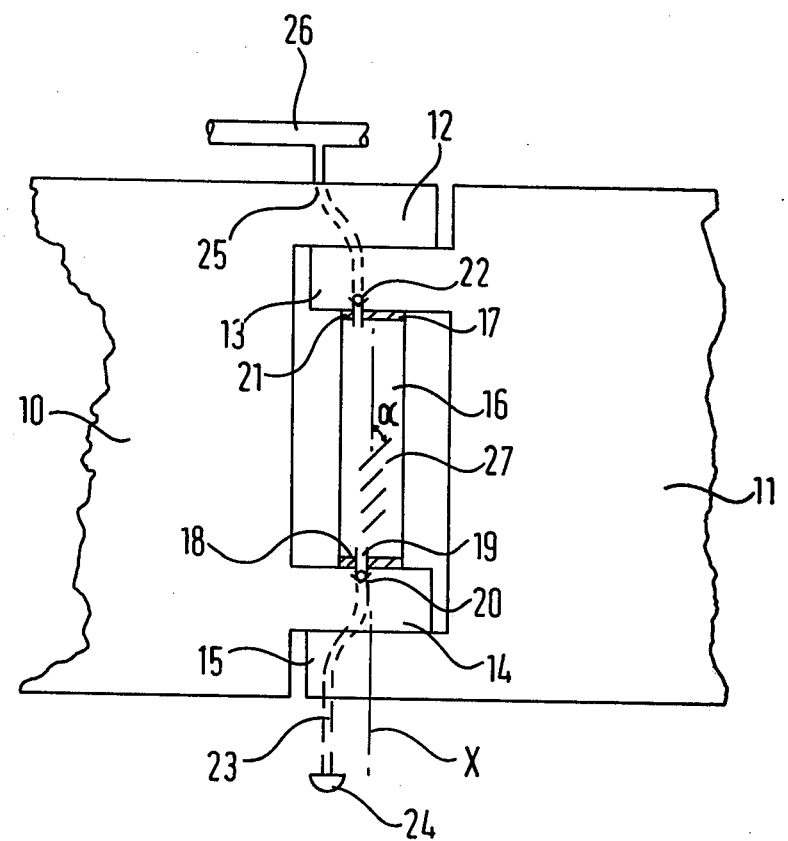

United States Patent [19]

Morris

[11] 4,268,226
[45] May 19, 1981

[54] TUBE TYPE PUMP AND WAVE MOTOR

[75] Inventor: Ralph F. Morris, Fenny Drayton near Nuneaton, England

[73] Assignee: Dunlop Limited, London, England

[21] Appl. No.: 928,190

[22] Filed: Jul. 26, 1978

[30] Foreign Application Priority Data

Aug. 6, 1977 [GB] United Kingdom ............... 33061/77

[51] Int. Cl.³ .................. F04B 17/00; F04B 43/08
[52] U.S. Cl. ............................ 417/332; 417/478; 60/500
[58] Field of Search ........... 417/330, 331, 332, 478, 417/479, 480; 60/500

[56] References Cited

U.S. PATENT DOCUMENTS

| 3,758,788 | 9/1973 | Richeson | 60/500 |
| 3,839,983 | 10/1974 | McAusland | 417/478 |
| 4,076,464 | 2/1978 | Pinney | 417/332 |
| 4,077,213 | 3/1978 | Hagen | 417/331 |

FOREIGN PATENT DOCUMENTS

| 1156026 | 12/1957 | France | 417/478 |
| 11352 | 5/1962 | Norway | 417/478 |
| 962642 | 7/1964 | United Kingdom | |
| 2002052 | 2/1979 | United Kingdom | 417/331 |

*Primary Examiner*—Richard E. Gluck
*Attorney, Agent, or Firm*—Stevens, Davis, Miller & Mosher

[57] ABSTRACT

The invention provides a pump in the form of a length of hose reinforced by at least one extensible multi-filament strand, or parallel multi-filament strands, wound helically about it which during the application of torsion or tension to the hose is wound up, or has its helix angle reduced, so as to constrict the hose. In a torsion pump the reinforcement is unbalanced, meaning that there is no opposite helix, but in a tension pump reinforcement strands are wound about the hose in opposite senses providing a balanced structure.

Preferably means is provided whereby relative movement between two members 10 and 11 caused by waves is used to distort and relax the length of hose 16, the resulting changes in its internal volume serving to pump water between inlet and outlet lines controlled by non-return valves 20 and 22. The hose length 16 is subjected to torsion as two rafts 10 and 11 pivot about an axis x, but in an alternative embodiment a hose length transverse to axis x is subject to tension.

5 Claims, 2 Drawing Figures

4,268,226

TUBE TYPE PUMP AND WAVE MOTOR

This invention relates to a pump particularly, although not exclusively, suitable for inclusion in wave energy conversion apparatus.

In accordance with the present invention there is provided a pump comprising a length of hose, end closures to which opposite ends of the hose are connected in a fluid-tight manner, fluid inlet and outlet means communicating with the hose interior and means for producing relative movement between the end closures so as to vary the internal volume of the hose, wherein the hose is reinforced by a substantially inextensible reinforcement wound helically about the hose and arranged so that when the end closures are relatively moved to reduce the internal volume of the hose fluid within the hose is subject to a constricting action of the reinforcement on the hose.

The reinforcement preferably comprises a multi-filament strand or parallel multi-filament strands of high modulus material, for example a Youngs Modulus of at least $1 \times 10^6$ lb.in.$^2$. Examples of suitable strand material are steel, nylon, cotton, polyester, glass fibre or Kevlar. The reinforcement may be constituted by a weftless cord fabric layer, i.e. one having in the weft direction only a few threads interwoven with the warp cords to facilitate handling.

The reinforcement is preferably secured at opposite ends thereof to the end closures and may be united to the hose. The hose length may be of resilient material in which the reinforcement is embedded.

The pump is advantageously incorporated in wave energy conversion apparatus comprising two interconnected members adapted to undergo relative movement under the influence of waves in water in which the members are placed, the length of hose being connected at its opposite ends to the respective members so as to be distorted and relaxed in response to relative movement of the members, and water inlet and outlet means being provided communicating within the interior of the hose length and controlled by respective non-return valves, the arrangement being such that the internal volume of the hose length varies as it is distorted and relaxed and such that when the hose length is relaxed it will tend to draw water through the inlet, the outlet being closed by the non-return valve therein, and when the hose length is distorted it will tend to expel water from its interior through the outlet, the inlet being closed by the non-return valve therein.

Said members may be flotation members which are hinged together for relative angular movement under the influence of waves in water in which they float and the hose length may have fluid-tight end closures fast with the respective flotation members, at least one of which end enclosures is penetrated by said inlet and outlet means. In this arrangement the hose length and the end closures may be substantially coaxial with said hinge, the arrangement being such that relative angular movements of said members twist and untwist the hose length.

In such constructions in which the hose length is to be subject to torsional forces the reinforcement is preferably an unbalanced reinforcement arranged to be wound up to constrict the hose length in the pumping mode of operation of the pump. By an "unbalanced" reinforcement is meant one which consists of strand wound in one sense only about the hose, so that there is no opposite helix which will undergo an opposite twist.

The unwinding of the unbalanced reinforcement during the suction mode of operation of the pump tends to increase the internal volume of the hose length and is not opposed by an oppositely wound strand.

In arrangements in which the hose is subjected to torsion the unbalanced reinforcement preferably has a helix angle in the unstressed condition of the hose in the range 40°–60° and preferably in the region of 55°44′. By the "helix angle" of a reinforcement is meant the acute angle formed between a tangent to the helix and its axis.

Alternatively the hose length may be arranged transverse to and spaced from the axis of said hinge, the arrangement being such that relative angular movement of said members causes longitudinal tensioning and relaxation of the hose length.

In arrangements such as that of the preceding paragraph in which the hose is subjected to tension but not torsion the reinforcement is preferably a balanced structure comprising strands oppositely helically wound about the hose length, the arrangement being such that the helix angle of each strand is reduced when the hose is tensioned so that the strand applies a constricting force to the hose. During relaxation of the hose length the tendency of the oppositely wound strands to return to equilibrium helix angles is utilised to tend radially to expand the hose length and increase its internal volume. In balanced reinforcement structures the helix angle of each strand is preferably less than 50° and is preferably in the range 15°–50°.

Figure 2:
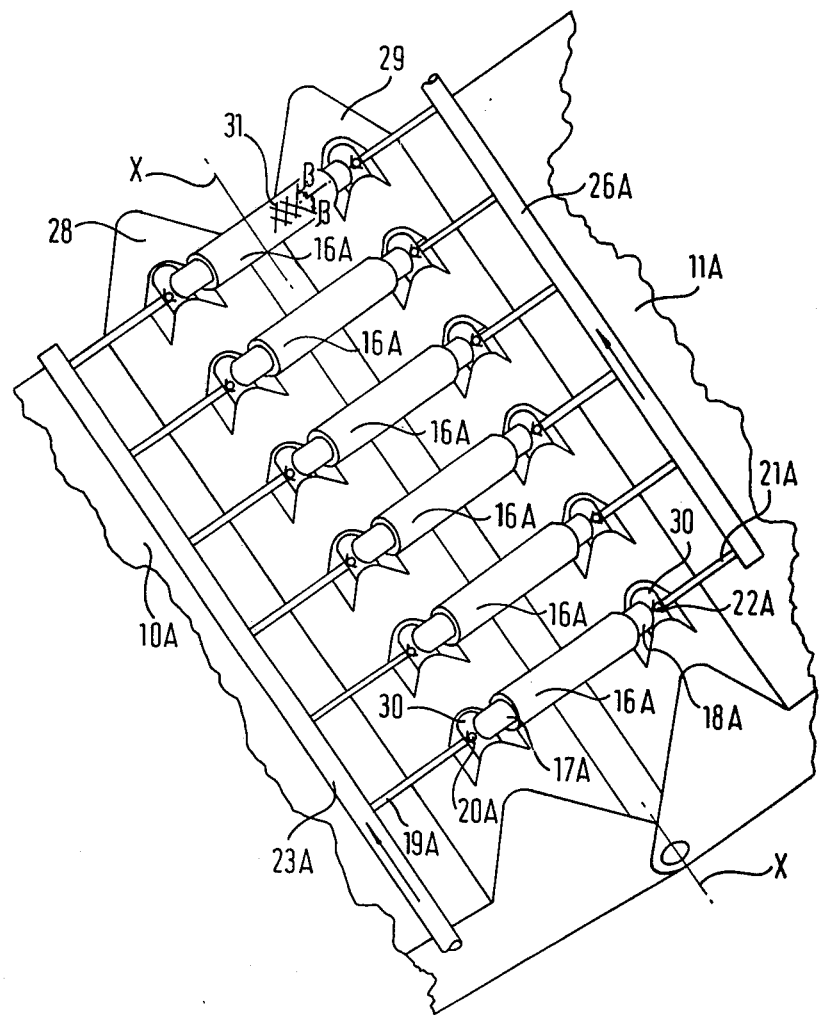

Preferred embodiments of the invention will now be described with reference to the accompanying diagrammatic drawings, in which:

FIGS. 1 and 2 are plan views of two different forms of pump applied to similar wave energy conversion apparatus.

The wave energy conversion apparatus illustrated in FIG. 1 comprises two flotation members or rafts 10 and 11 which are pivotally interconnected for relative angular movement about the axis x by suitable bearings (not shown) passing between adjacent arms 12 and 13 and 14 and 15 of the rafts. The rafts 10 and 11 are shown only in part and not in detail as their precise configuration is immaterial to the present invention. It is believed sufficient to say that they are designed to float in water and maintain an upright attitude in which their surfaces which are visible in the drawing are approximately parallel with the surface of the water and the axis x is approximately horizontal. The dimensions of the rafts are adapted to the size of wave which they are expected to encounter in use, the intention being that waves moving relative to the rafts in a direction transverse to the axis x will hinge the rafts about the axis x as it rises and falls between troughs and crests of the waves. In accordance with the present invention a length of hose 16 extends between arms 13 on the raft 11 and arm 14 of the raft 10. The hose makes a water-tight seal with end closures 17 and 18 which are fast respectively with arm 13 and arm 14, the effect of this arrangement being that as the rafts 10 and 11 move angularly relative to one another about axis x the hose 16, which is generally coaxial therewith, is subject to torsion forces through the counter-rotation of its ends. Twisting of the hose 16 decreases and untwisting increases its internal volume and in accordance with the invention this variation of the internal volume of the hose length 16 is used to pump water through it. To achieve this the end closure 18 is penetrated by an inlet 19 controlled by a non-return valve 20 and the end closure 17 is penetrated by an outlet 21 which is controlled by a non-return valve 22. A flexible pipe 23 communicates the inlet 19 with a weighted and filtered intake opening 24 and a flexible pipe 25 communicates the outlet 21 with a reservoir (not shown) for the pumped water, in the illustrated embodiment via a main hydraulic pipeline 26 which is suitably also flexible.

The pipeline 26 is used to interconnect the outlet 21 of the apparatus shown with other, similar apparatus (not shown) by discharging to the same reservoir. For example the two rafts shown may form part of a linearly-extended series of articulated rafts by pivotally connecting another raft to the end of one or both of the rafts 10 and 11 which is not visible in the drawing, so that the parallel pumps of the series discharge to the same pipeline 26. The arrangement shown, or the series just described, can also be combined with other, non-parallel arrangements or series discharging to the same reservoir. For different pairs of rafts to have their axes of mutual articulation non-parallel will provide the advantage that at least one pump will operate in whatever direction a wave approaches the rafts.

Water collected in the reservoir can be used to power a hydro-electric installation the output of which can in turn be used to electrolyse water to produce hydrogen and other elements, especially from sea water.

In accordance with a preferred feature of the invention the length of hose 16 is of resilient material, such as rubber, and has an unbalanced reinforcement 27 in the form of a strand, or parallel strands, of inextensible material such as steel, nylon, cotton, polyester or glass fibre wound helically about the hose 16. A reinforcement in the form of parallel strands may be provided by a weftless cord fabric layer in which the warp strands are held together by a few interwoven weft threads for ease of handling. The reinforcement 27 is secured at opposite ends of the hose to the end closures 17 and 18 and may be embedded in or otherwise secured to the hose length intermediate its ends. The reinforcement 27 is "unbalanced" in the sense that the helix, or the parallel helices, are wound about the hose 16 in one sense only, such that the helix is wound up to constrict the hose when the hose is twisted and is unwound as the hose untwists. During untwisting of the hose the unwinding reinforcement will tend to expand the hose. It may not exert a strong expansion force on the hose, but it should be borne in mind that in the suction mode of operation of the pump it lifts water only a short distance, the pump 16 being close to the water level, so that no great suction is required. In the pumping mode of operation, on the other hand, the inextensible reinforcement 27 positively constricts the hose 16 and prevents it from expanding, so that high pumping forces are exerted on water in the hose capable of passing it along what may be a lengthy pipeline 26 to a reservoir which may be at a greater elevation above the pump 16 that the latter is above the water level.

The preferred helix angle α of the reinforcement 27 in the embodiment of FIG. 1 is 55°44', or at least in the range 40°-60°, to ensure an adequate constricting action and little resistance to unwinding.

In the alternative embodiment of the invention shown in FIG. 2, a plurality of parallel hose lengths 16A are arranged transversely to and spaced from the axis x about which two rafts 10A and 11A are pivotally interconnected. The rafts 10A and 11A resemble the rafts 10 and 11 of FIG. 1 except that their adjacent sides have upstanding formations 28 and 29 between which the hose lengths 16A extend, the opposite ends of each hose length 16A having water-tight end closures 17A and 18A which are pivotally connected to the respective formations 28 and 29 by trunnions 30 freely rotatable in the formations 28 and 29, so that relative angular movement of the rafts 10A and 11A while it will extend or relax the hoses 16A longitudinally will not cause them to bend or kink.

Within the trunnions 30 associated with each hose length 16A are non-return valves 20A and 22A which control passages 19A and 21A respectively penetrating the end closures 17A and 18A and placing the interior of each hose length 16A in communication, respectively, with a common inlet line 23A and a common discharge line 26A. The common inlet line 23A has a weighted and filtered intake opening (not shown) arranged to sink alongside the rafts into the water in which they float, and the common discharge line 26A is arranged to supply a reservoir (not shown) for the pumped water, serving as an energy storage device. The discharge line 26A may, of course, be interconnected with corresponding discharge lines (not shown) at the junctions of other rafts mutually pivotted about axes parallel or transverse to the axis x.

Unlike the hose length 16 in FIG. 1, each hose length 16A in FIG. 2 has a balanced reinforcement structure 31 consisting of at least two strands of inextensible material oppositely helically wound about the hose 16A. If the reinforcement 31 comprises parallel strands the helices wound about the hose in one sense are preferably balanced by an equal number of helices wound about the hose in the other sense. The helix angle β of the strands wound about the hose 16A in both senses is less than 50°, in the range 15°-50°.

The effect of this arrangement is that angular movement of the rafts 10A and 11A about the axis x alternately stretches and relaxes the hose length 16A longitudinally, thereby reducing and increasing their internal volumes. The tendency of each hose length to expand as it is relaxed, which is promoted by the tendency of the helices of the reinforcement 31 to return toward equilibrium helix angles, causes the non-return valves 22A to close and the non-return valves 20A to open and water to be sucked into the hoses from the line 23A. When the hoses 16A are extended the helix angle β of each reinforcement strand is reduced causing it to exert a constricting action on the associated hose and helping to pump water out of the hose to the discharge line 26A, the non-return valves 20A closing and the non-return valves 22A opening.

Having now described our invention what we claim is:

1. A wave energy conversion apparatus comprising:
   a pair of members interconnected by a hinge adapted to undergo relative angular movement under the influence of waves in a body of water; and,
   a pump comprising a length of hose, end closures for said hose, means connecting opposite ends of said hose to said end closures in a fluid tight manner, fluid inlet and outlet means communicating with the hose interior, and non-return valves respectively provided in said fluid inlet and outlet, said hose being reinforced by a substantially inextensible reinforcement wound helically about said hose and arranged so that when said end closures are relatively angularly moved fluid within said hose is subject to a constricting action by said reinforcement, said end closures being connected to said pair of pivoted members with said end closures being substantially coaxial with said hinge members such that said hose is twisted and untwisted in response to relative angular movement of said members to vary the internal volume of said hose, said hose drawing fluid through said inlet and associated non-return valve when untwisting and expelling water through said outlet and associated non-return valve when twisting.

2. Apparatus as claimed in claim 1 wherein the reinforcement is an unbalanced reinforcement arranged to be wound up to constrict the hose length in the pumping mode of operation of the pump.

3. Apparatus as claimed in claim 2 wherein unwinding of the reinforcement during the suction mode of operation of the pump tends to increase the internal volume of the hose length.

4. Apparatus as claimed in claim 2 wherein the helix angle of the reinforcement in the unstressed condition of the hose is in the range 40°–60°.

5. Apparatus as claimed in claim 4, wherein the helix angle of the reinforcement is in the region 55°44'.

* * * * *